United States Patent [19]

Lapper

[11] 3,834,262

[45] Sept. 10, 1974

[54] STOCK CUTTING MEASUREMENT SYSTEMS

[75] Inventor: Maurice Noel Lapper, Llanelli, South Wales, Wales

[73] Assignee: British Steel Corporation, London, England

[22] Filed: Nov. 29, 1972

[21] Appl. No.: 310,462

[30] Foreign Application Priority Data
Dec. 3, 1971  Great Britain ............... 56285/71

[52] U.S. Cl. .................... 83/345, 83/369, 83/522
[51] Int. Cl. ............................................. B26d 7/28
[58] Field of Search ............ 83/287, 293, 296, 369, 83/522, 208, 345, 76, 74, 75

[56] References Cited
UNITED STATES PATENTS

| | | | |
|---|---|---|---|
| 1,947,399 | 2/1934 | Umansky | 83/287 X |
| 2,866,428 | 12/1958 | Stanfield et al. | 83/369 X |
| 3,181,403 | 5/1965 | Sterns et al. | 83/76 |
| 3,411,388 | 11/1968 | Rappapont | 83/369 X |
| 3,424,041 | 1/1969 | Giraud | 83/287 X |
| 3,499,354 | 3/1970 | Layman | 83/287 |
| 3,550,493 | 12/1970 | Benbenek | 83/522 X |
| 3,628,410 | 12/1971 | Shields | 83/287 |
| 3,670,614 | 6/1972 | Streckert | 83/369 |

*Primary Examiner*—J. M. Meister
*Attorney, Agent, or Firm*—Bacon & Thomas

[57] ABSTRACT

Apparatus for determining the length of portions cut from stock material characterised by a stock pulse generator 15 responsive to the movement of the stock past a cutting device 10 to provide a stock pulse train, the repetition rate of which is related to the speed of advance of the stock; a cutter pulse generator 17 responsive to the cutting device for producing a cutter pulse train, the repetition rate of which is related to the frequency of cutting operations of the cutting device, a counter 40 for counting the pulses produced by the stock pulse generator; means 38 for starting the counter in response to a cutter pulse and for stopping the counter after a predetermined further number of cutter pulses have been generated, whereby the number of stock pulses then recorded by the counter is representative of the length of the last $n$ portions cut from the stock, $n$ a predetermined integer in excess of one.

8 Claims, 4 Drawing Figures

STOCK CUTTING MEASUREMENT SYSTEMS

This invention relates to apparatus for measuring the movement of a ferromagnetic member. It is especially applicable to measurement of the movement of ferromagnetic stock (e.g. steel strip) through a flying shear.

When cutting a large number of sheets of a specified size from a continuous strip to fulfil an order placed by a customer it has generally been the practice to cut each sheet slightly over-size to ensure the customers requirements are met. This has been necessary because of the difficulty of rapidly measuring a large number of sheet accurately. There are, however, disadvantages to this system from both the customer's point of view and the manufacture's point of view. If customer has specified a particular size of sheets and they arrive oversize he is involved in an extra operation to trim the sheets down to the size required; this involves the wastage of a considerable amount of time and of material. From the manufacturers point of view the excess material in each oversize is wasted as it could otherwise have been sold. Furthermore in setting-up a flying shear, considerable quantities of markedly oversize sheets are produced before the required dimension is established, leading to further waste.

The present invention provides apparatus which is capable of accurately measuring the length of cut sheet or other stock thus permitting the sheets to be cut accurately and permitting quicker setting-up of the shear.

According to the invention there is provided apparatus for determining the length of portions cut from stock material comprising a stock pulse generator adapted to respond to the movement of the stock past a cutting device to provide a stock pulse train, the repetition rate of which is related to the speed of advance of the stock; a cutter pulse generator adapted to respond to the cutting device to provide a cutter pulse train, the repetition rate of which is related to the frequency of cutting operations of the cutting device, a counter for counting the pulses produced by the stock pulse generator; means for starting the counter in response to a cutter pulse and for stopping the counter after a predetermined further number of cutter pulses have been generated, whereby the number of stock pulses then recorded by the counter is respresentative of the length of the last $n$ portion cut from the stock, $n$ being a predetermined integer in excess of one.

The cutter pulse generator may produce one cutter pulse for every cutting operation of the cutter.

There may be a display device arranged to display substantially 1/nth of the said number of stock pulses recorded by the counter whereby to represent the mean length of the said $n$ portions.

There may be means whereby the display device maintains its display whilst the counter counts the stock pulses representative of the next n portions being cut from the stock, the display then being reset.

The stock pulse generator may comprise a rotor, means for maintaining the stock in contact with the rotor, and means for generating the stock pulse train in dependence upon rotation of the rotor in response to movement of the stock.

When the apparatus is for use with ferromagnetic stock, it may comprise means for magnetically attracting the stock into contact with the rotor.

There may be means for adjusting the count of stock pulses or a proportion thereof to compensate for error in the diameter of the rotor surface which contacts the stock.

The apparatus may comprise a store adapted to receive the count of stock pulses or a proportion thereof; and means for adding algebraically thereto a predetermined quantity to compensate for said error.

One embodiment of the invention will now be described by way of example, with reference to the accompanying drawings, in which:

FIG. 4 is a section on line A—A in FIG. 3.

Figure 1:
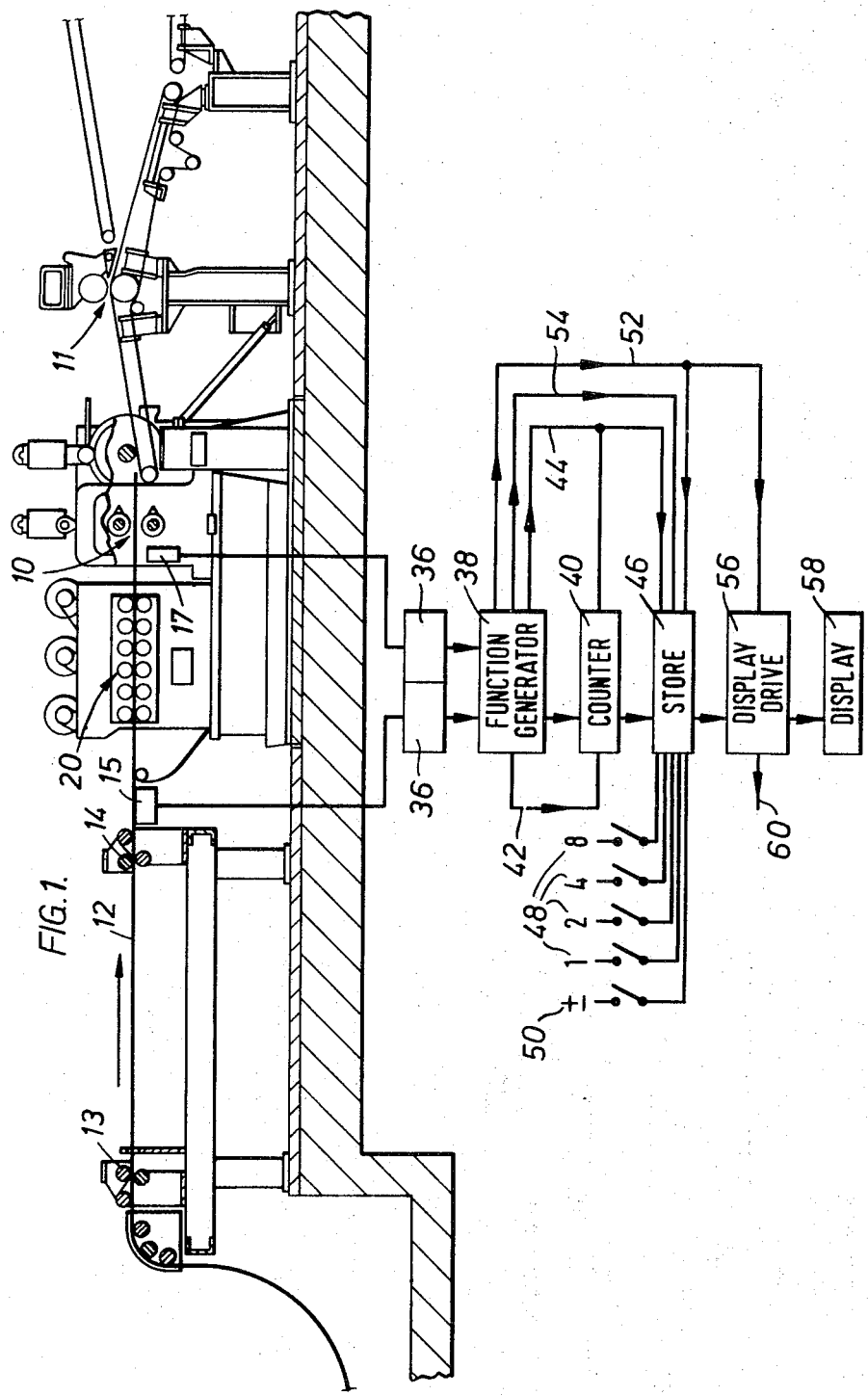
FIG. 1 is a side view of part of a production line partly in block diagram form, for producing cut sheets from strip material

Referring now to FIG. 1 there is shown part of a ferromagnetic steel strip production line where the strip 12 is cut into sheets by a flying shear 10 from which it passes to a sheet classifying section 11. The strip 12 is driven by pinch rolls 13, 14 and leveller rolls 20.

Figure 2:
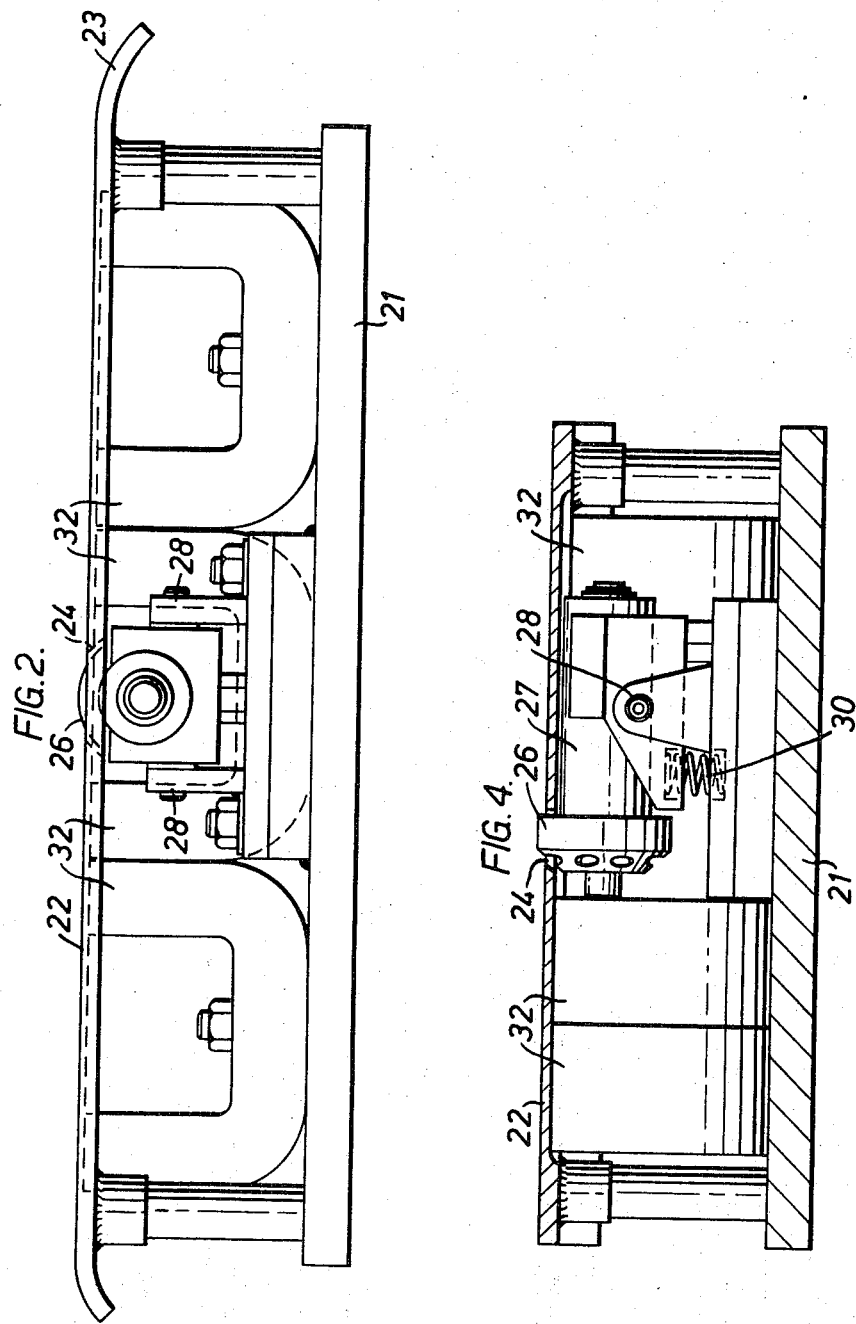
FIG. 2 is a schematic side view of a stock pulse generator for use with ferromagnetic strip in a system as shown in FIG. 1

A pulse generator 15, to be more particularly described with reference to FIG. 2, is placed in the path of strip 12 to produce a train of output pulses ("stock pulses") in response to the movement of the strip 12. The pulse generator 15 produces one pulse for every 0.010 inches of movement of the strip 12. Thus if the strip 12 is advancing at a speed of 1,000 feet per minute the pulse generator 15 produces a train of output pulses at a frequency of 20 KH$_z$. A rotary pulse generator 17 is responsive to the rotation of the flying shear 10 and generates pulses ("cutter pulses") at the rate of one per cutting action of the shear. In this example, the shear 10 effects one cutting action per revolution.

Figure 3:
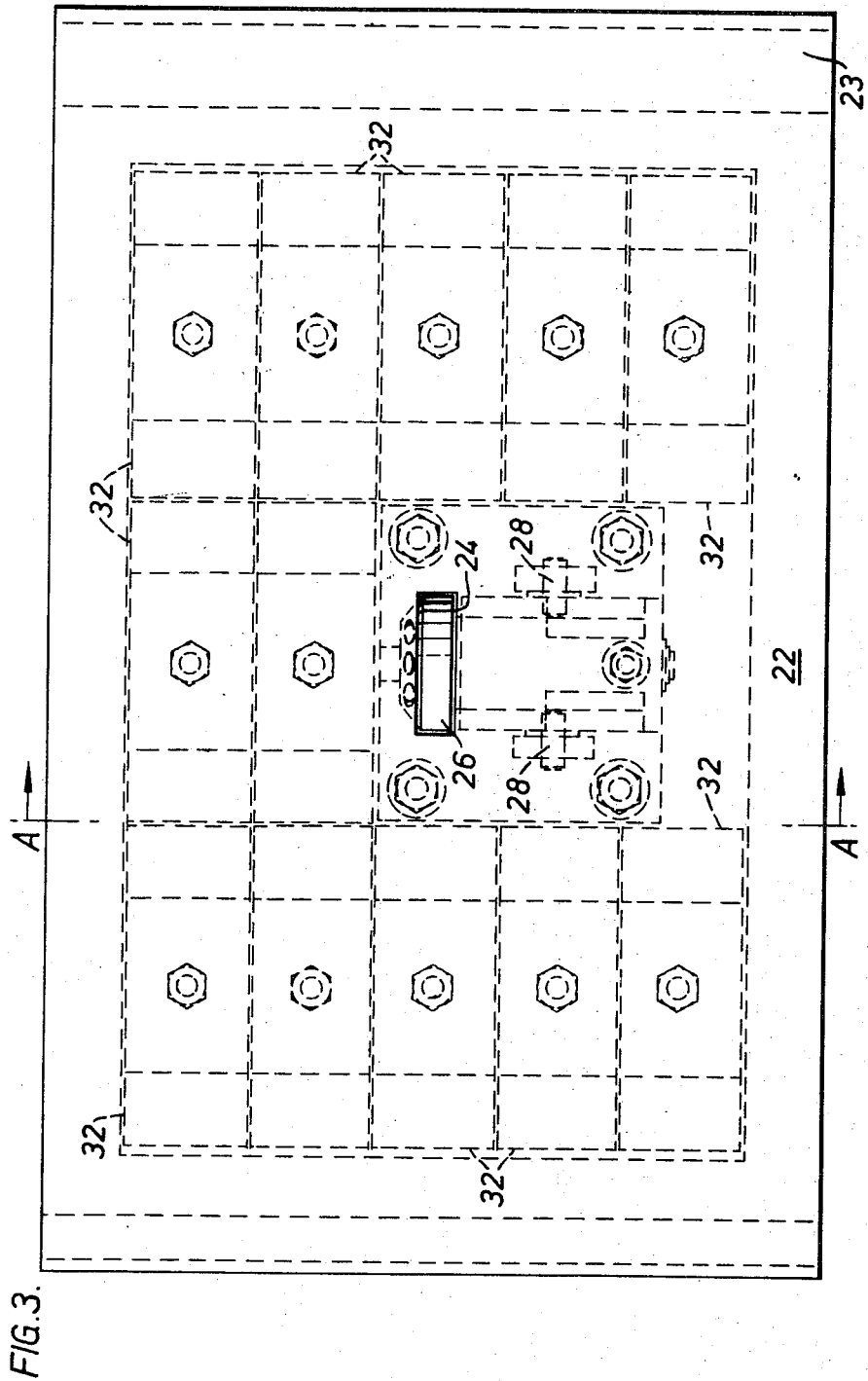
FIG. 3 is a plan view of the apparatus shown in FIG. 2.

Referring to FIGS. 2, 3, and 4 the stock pulse generator 15 is shown in more detail. The pulse generator comprises a base structure 21 which supports a brass surface 22 over which the strip 12 passes. The leading edge 23 of the surface 22 is shaped to steer strip of bad shape over the surface. The surface 22 has a gap 24 through which projects part of the circumference of a ferromagnetic rotor 26.

The rotor 26 is mounted on the shaft of a photoelectric digitiser which produces 600 pulses per revolution. The diameter of the rotor 26 nominally is 1.9099 inches so that the digitiser produces 1 pulse for every 0.010 inches of circumferential movement of the rotor 26. The rotor 26 is hollow and fits over the end of the digitiser 27 so that its surface in contact with the strip is aligned with the shaft bearing within the digitiser, reducing bending moments on the bearing.

The digitiser 27 is mounted on trunnions 28 so that it is pivotable about a horizontal axis perpendicular to its shaft axis. A spring 30 biasses the digitiser 27 about its trunnion axis so that the axis of its shaft carrying the rotor 26 is parallel to the surface 22. However, the spring 30 and the trunnion mounting permits the rotor and digitiser to be deflected beneath the surface 22 to avoid damage, for example if trodden upon inadvertently by a workman.

Beneath the surface 22 are a number of permanent magnets 32 arranged around the rotor both ahead of and behind it in the direction of movement of the strip.

The magnets are V-shaped, and have their pole pieces directly under the surface 21. The magnets pull the strip hard down onto the surface 22 and into contact with the rotor 26. The field of the magnets 32 also passes through the rotor 26, magnetising it and attracting the strip directly onto the rotor 26. Thus, as the strip moves the rotor 26 rotates, each 0.010 inches of strip movement producing a pulse from the photoelectric digitiser. Because the rotor 26 and the digitiser have a very low inertia relative to the strip, the rotor can follow accurately and without delay any transient changes in the speed of the strip that are likely to occur.

Referring back to FIG. 1, the processing of the stock pulses and the other pulses now will be described.

The cutter pulses and stock pulses pass from the pulse generators 15, 17 through respective pulse shapers 36 to a control function generator 38. The control functions (described later) are generated from the cutter pulses. The stock pulses are fed through a gating circuit in the function generator 38 to a counter 40. The function generator controls the counter by means of a start/stop function on line 42. The gating circuitry ensures that the start function is produced only in synchronism with the leading edge of a stock pulse, in order to avoid possible counting inaccuracies.

The function generator starts the counter in response to the leading edge of a cutter pulse, and stops it in response to the leading edge of the tenth consecutively following cutter pulse. Thus, the number of stock pulses counted by the counter represents the total length of the last ten cut sheets produced.

Also in response to the leading edge of the tenth cutter pulse, the function generator produces a "dump" signal on line 44, which causes the counter 40 to transfer its contents to a store 46 and recommence counting stock pulses. The tenth cutter pulse of course constitutes the first of the next succeeding ten cutter pulses. When transferring the stock pulse count to the store, the counter divides by ten by shift-division and drops the last significant figure, rounding the result up or down as appropriate. Thus the contents of the store represents the mean length of the last ten cut sheets.

The store 46 is provided with means for adjusting the stock pulse count to compensate for errors in the diameter of the rotor 26. There is unavoidably a slight machining tolerance on the diameter of the rotor, and furthermore the rotor wears with use, changing its diameter slightly.

The error-compensating circuitry comprises 9-bit switching 48 together with a plus and minus selector 50. According to the length of the sheet being cut and the accurately known actual diameter of the rotor 26 (this is checked periodically), the switching 48, 50 is employed to set a false zero in the store, of between −15 and +15 units. When the store is nominally 'zeroed' it in fact retains this quantity in its register. Then when the divided-by-ten stock pulse count is entered in the store 46, the false zero quantity is added algebraically to it, giving a corrected sheet length.

The divided and adjusted stock pulse count remains in the store 46 for only a short time. The trailing edge of the shaped tenth cutter pulse initiates an updating function on line 52 and a store-zeroing function on line 54.

In response to these functions, the store 46 transfers its contents to a display drive unit 56, and returns to its false zero to await the next divided stock pulse count. The display drive unit 56 produces a visual read-out of the mean sheet length on a panel 58, and also provides a binary-coded decimal output 60 for use if a remote display is required. The display is retained until the store 46 transfers the mean pulse count for the next 10 sheets to the display drive unit 56 whereupon the display is re-set.

Thus, the mean length of 10 sheets is displayed. This is a more accurate indication of sheet length than an indication of the length of a single sheet because a consistent error in sheet length is retained and is easily noticeable, whereas if the length of single sheets were sampled at random, transient variations may mask a consistent trend towards out-of-tolerance error. Furthermore when relatively short sheets are being cut, the display is shown long enough to be resolved by the human eye. The speed of the flying shear can then be adjusted to maintain the length of the cut sheets to that desired.

It will be appreciated that the number of sheets of which the total length is measured is to some extent a matter of choice. According to the length of the sheets, the strip speed and the accuracy of the generator 15, the number of sheets may for example be five or less, or may be for example significantly more than ten. However, ten is considered most convenient because the mean length of the cut sheets is readily available by shift-division between the counter 44 and the store 46.

It also will be appreciated that, if sufficient store and display capacity is available, the total length of 10 cut sheets may be displayed. To achieve this the shift-division between the counter 44 and the store 46 is by-passed. A display of the total length may be preferable when the sheets are very short and when greatest accuracy is required.

I claim:

1. Apparatus for determining the length of portions cut from stock material comprising a stock pulse generator responsive to the movement of the stock past a cutting device to provide a stock pulse train, the repetition rate of which is related to the speed of advance of the stock; a cutter pulse generator responsive to the cutting device for producing a cutter pulse train, the repetition rate of which is related to the frequency of cutting operations of the cutting device, a counter for counting the pulses produced by the stock pulse generator; and means for starting the counter in response to a cutter pulse and for stopping the counter after a predetermined further number of cutter pulses have been generated and n portions of material have been cut from the stock, the number of stock pulses then recorded by the counter being representative of the length of the n portions cut from the stock so as to be capable of providing an indication of any consistent error in the cut sheet length, n being a predetermined integer in excess of one.

2. Apparatus as claimed in claim 1 wherein the cutter pulse generator produces one cutter pulse for every cutting operation of the cutter.

3. Apparatus for determining the length of portions cut from stock material comprising a stock pulse generator responsive to the movement of the stock past a cutting device to provide a stock pulse train, the repetition rate of which is related to the speed of advance of the stock; a cutter pulse generator responsive to the cutting device for producing a cutter pulse train, the repetition rate of which is related to the frequency of cutting operations of the cutting device, a counter for counting the pulses produced by the stock pulse generator; means for starting the counter in response to a cutter pulse and for stopping the counter after a predetermined further number of cutter pulses have been generated, the number of stock pulses then recorded by the counter being representative of the length of the $n$ portions cut from the stock, $n$ being a predetermined integer in excess of one, and a display device to display substantially 1/nth of the said number of stock pulses recorded by the counter whereby to represent the mean length of the said $n$ portions.

4. Apparatus as claimed in claim 3 comprising means controlling the display device to maintain its display whilst the counter counts the stock pulses representative of the next $n$ portions being cut from the stock, the display then being reset.

5. Apparatus as claimed in claim 1 wherein the stock pulse generator comprises a rotor, means for maintaining the stock in contact with the rotor, and means for generating the stock pulse train in dependence upon rotation of the rotor in response to movement of the stock.

6. Apparatus for determining the length of portions cut from ferromagnetic stock material comprising a stock pulse generator responsive to the movement of the stock past a cutting device to provide a stock pulse train, the repetition rate of which is related to the speed of advance of the stock, said stock pulse generator comprising a rotor, means for magnetically maintaining the stock in contact with the rotor, and means for generating the stock pulse train in dependence upon rotation of the rotor in response to movement of the stock; a cutter pulse generator responsive to the cutting device for producing a cutter pulse train, the repetition rate of which is related to the frequency of cutting operations of the cutting device, a counter for counting the pulses produced by the stock pulse generator; means for starting the counter in response to a cutter pulse and for stopping the counter after a predetermined further number of cutter pulses have been generated, the number of stock pulses then recorded by the counter being representative of the length of the n portions cut from the stock, $n$ being a predetermined integer in excess of one.

7. Apparatus as claimed in claim 6, comprising means for adjusting the count of stock pulses or a proportion thereof to compensate for error in the diameter of the rotor surface which contacts the stock.

8. Apparatus as claimed in claim 7 comprising a store adapted to receive the count of stock pulses or a proportion thereof, and means for adding algebraically thereto a predetermined quantity to compensate for said error.

* * * * *